Jan. 24, 1967   J. E. RANDOLPH   3,300,163
COLLET FOR ELONGATED MEMBERS
Filed March 14, 1966

INVENTOR
JOHN E. RANDOLPH
BY R.C. Terry

United States Patent Office 3,300,163
Patented Jan. 24, 1967

3,300,163
COLLET FOR ELONGATED MEMBERS
John E. Randolph, Palatine, Ill., assignor to Teletype Corporation, Skokie, Ill., a corporation of Delaware
Filed Mar. 14, 1966, Ser. No. 534,234
6 Claims. (Cl. 248—56)

This invention relates to collets for elongated members and more particularly to collets for securing elongated bodies having flexible outer coverings.

In the manufacture of electrical devices it is often necessary to pass an electrical cable through the wall or housing of the device. In such cases it is desirable to provide a collet for the cable so that the wall or housing will not cut through the insulation of the cable and into the electrical conductors contained therein. Often it is desirable to have the collet grip or secure the cable with respect to the housing so that a force applied to the cable cannot be transferred into the housing to damage the electrical components to which the cable is attached. In order that the electrical device with which collets are employed may be as low in cost as possible it is necessary that the collets employed therein be constructed from inexpensive and easily manufactured parts, and it is desirable that the collets be capable of being assembled without the use of complicated tools.

Accordingly, it is an object of this invention to provide an improved collet for elongated members which is low in cost and easily manufactured.

Another object of this invention is to provide a collet for elongated members which grip such members so that they cannot be moved with respect to the collet.

It is a further object of this invention to provide a collet for elongated members which can be assembled without the use of tools.

In the preferred embodiment of the invention these and other objects are achieved by providing a resilient plug having a generally tubular shape and having self-tapping threads on its inner surface and a rigid housing member. In use the plug is threaded onto the insulation or other flexible covering of an elongated member and is then inserted into the housing which compresses the plug radially with respect to the elongated member thereby causing the plug to grip the elongated member more securely. When the plug is fully inserted in the housing a ridge formed on the plug overlaps a ridge formed in the housing and serves to prevent the two parts from being separated one from the other. The housing is then attached to the wall of an electrical or other device thereby providing a collet for the elongated member which prevents the elongated member from being moved with respect to the device.

A more complete understanding of the invention may be had by referring to the following detailed description when considered in conjunction with the drawings wherein.

Figure 1:
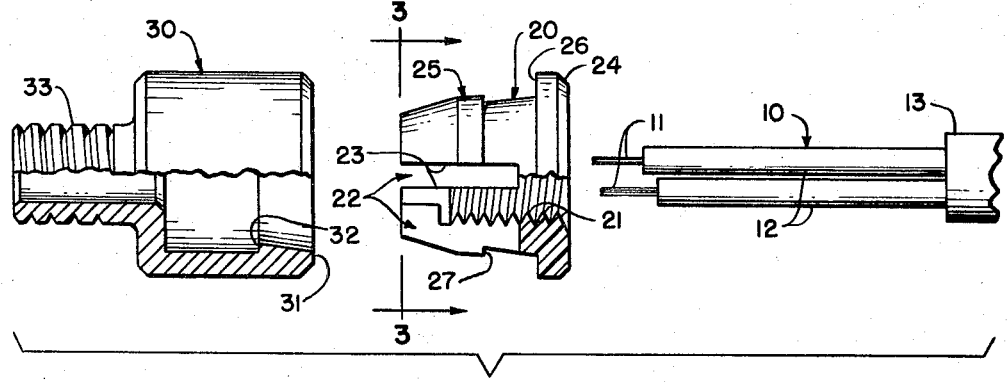
FIG. 1 is an exploded view of a collet embodying the present invention in which certain parts are shown partially in section in order to illustrate certain features of the invention.

Referring now to the drawings, wherein like reference numerals designate like parts throughout the several views, there is shown a collet for elongated members. In the drawing the collet is shown in conjunction with an elongated member 10 comprised of electrical conductors 11, insulated coverings 12 for the conductors 11 and an outer flexible covering 13. It should be understood, however, that this invention is capable of being practiced with any elongated member having a flexible or yieldable outer covering similar to the covering 13 and is not restricted to use with electrical cables in any manner whatsoever.

Figures 2, 3:
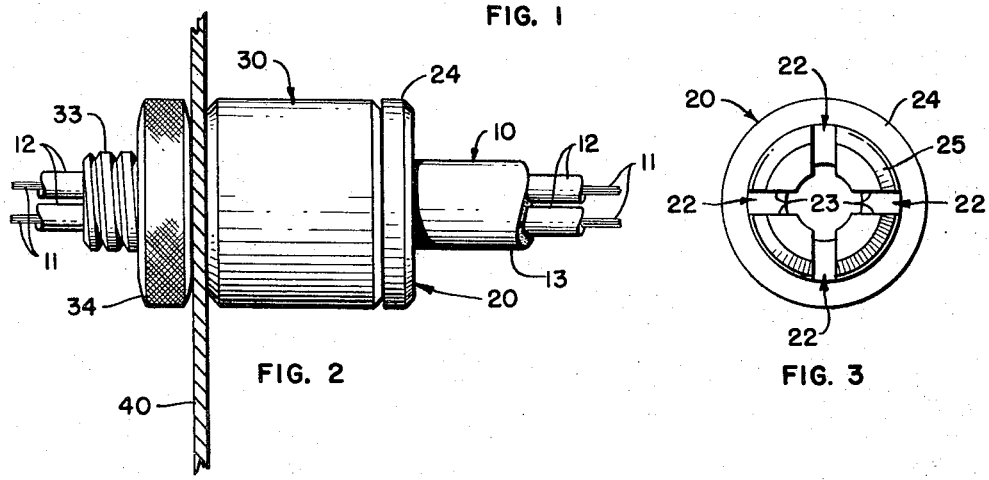
FIG. 2 is a side view of an assembled collet embodying the present invention.
FIG. 3 is an end view of a portion of the collet of the present invention taken along the line 3—3 in FIG. 1 in the direction of the arrows.

Referring now to FIG. 1 there is shown a disassembled collet for the elongated member 10 comprised of a resilient plug 20 and a rigid housing member 30. The plug 20 is tubular in shape and annular in cross-section and is formed from a resilient material such as plastic so that it may be deformed radially inwardly. On the inner surface of the plug 20 there is formed a plurality of self-tapping threads 21 which are adapted to be threadedly engaged with the outer flexible covering 13 of the elongated member 10. As is best shown in FIG. 3 the plug 20 is provided with a plurality of axial grooves or slots 22 defined by side walls 23 in its left end (FIG. 1) which add to the resiliency of the plug 20. In its outer surface the plug 20 is provided with a flange 24 and a ridge 25 which have opposing locating surfaces 26 and 27 formed on them. By means of the locating surfaces 26 and 27 the plug 20 may be secured in the housing member 30.

The housing member 30 is formed from a rigid material such as metal and may be constructed in any suitable manner, such as by casting. The housing member 30 is generally cup-shaped and is provided at its right end (FIG. 1) with a ridge having a pair of locating surfaces 31 and 32 which serve to engage the locating surfaces 26 and 27 of the flange 24 and the ridge 25 of the plug 20, respectively, thereby securing the plug 20 against axial movement with respect to the housing 30. At its left end (FIG. 1) the housing member 30 is provided with a threaded section 33 by means of which the housing member 30, and accordingly the entire collet assembly, may be attached to the wall of a device into which the elongated member 10 is to pass.

In use the resilient plug 20 is brought into engagement with the flexible covering 13 of the elongated member 10 and the self-tapping threads 21 of the plug 20 are threadedly engaged with the covering to form a gripping connection between the plug 20 and elongated member 10. The plug 20 with the elongated member 10 connected thereto is then inserted into the housing member 30 and the ridge 25 of the plug 20 is placed behind the surface 32 of the housing 30 so that the positioning of the plug 20 is fixed axially with respect to the housing 30.

The inside diameter of the portion of the housing 30 bordered by the locating surfaces 31 and 32 is slightly smaller than the outside diameter of the plug 20 in the region bordered by the flange 24 and the ridge 25. Accordingly, when the plug 20 is placed in the housing 30 it is compressed so that threads 21 of the plug 20 grip the flexible covering 13 of the elongated member 10 more securely and thereby prevent the elongated member 10 from being pulled out of the plug 20 and the housing 30. It has been found that when the plug 20 is formed from plastic and covering 13 of the elongated member 10 is one of the ordinary insulating materials, a connection made in the manner shown in the drawing will withstand a force of approximately 40 pounds applied between the housing 30 and the elongated member 10 without the elongated member 10 coming loose from the plug 20.

In FIG. 2 an assembled collet of the type shown in FIG. 1 is shown attached to a wall 40 of a device into which the elongated member 10 is to pass. In FIG. 2 the housing 30 is shown secured to the wall by means of a knurled nut 34 which is threaded to the threads 33 at the left end (FIG. 1 and FIG. 2) of the housing 30. It should be understood that the plug 20 may be attached directly to a wall 40 of a device into which the elongated member 10 is to pass by placing the wall 40 between the surfaces 26 and 27 if the distance between the flange 24 and the ridge 25 of the plug 20 is suitably dimensioned.

Figure 4:
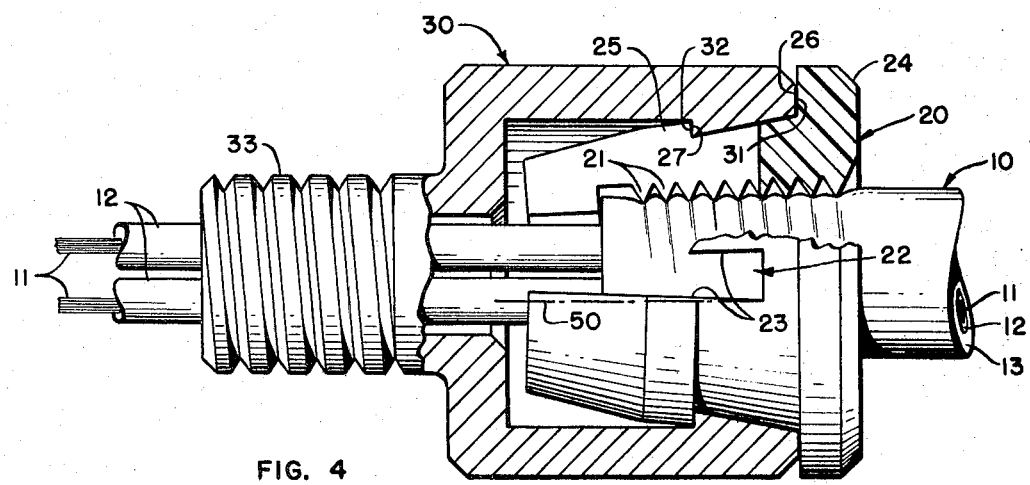
FIG. 4 is an enlarged, partial sectional view showing an assembled collet embodying the present invention.

Referring to FIG. 4 an assembled collet comprised of a plug 20 and a housing member 30 may be seen. In FIG. 4 the threaded engagement of the self-tapping threads 21 with the resilient covering 13 of the elongated member 10 may easily be seen. FIG. 4 also clearly illustrates the deviation of the side 23 of one of the slots 22 from a horizontal line 50 thus illustrating the amount of compression radially inwardly which the difference between the inner diameter of the housing 30 and the outer diameter of the plug 20 places on the left end (FIGS. 1 and 4) of the plug 20.

FIG. 4 also shows the interlocking relationship of the locating surfaces 26 and 27 on the flange 24 and the ridge 25 of the plug 20 with the locating surfaces 31 and 32 on the ridge of the housing member 30. This interlocking relationship prevents axial movement of the plug 20 with respect to the housing member 30 and also prevents the plug 20 from being withdrawn from the housing member 30 upon the application of a force on the elongated member 10.

As is most clearly shown in FIG. 4 the collet shown in the drawing is of the type wherein the resilient covering 13 of the elongated member 10 is brought into the collet and engaged therewith but is then terminated so that only the conductors 11 and insulating coverings 12 extend out of the left end (FIGS. 1, 2 and 4) of the collet. It should be understood, however, that by re-dimensioning the left end portion (FIGS. 1 and 4) of the plug 20 and housing 30 it is possible to construct a collet in accordance with the principles of the present invention in which the resilient covering 13 of the elongated member 10 passes completely through the collet and into a device with which the collet is to be employed.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A collet for elongated members having a flexible covering including:
 a resilient gripping member of tubular shape having threads formed on its inner surface for engaging and gripping a flexible covering on an elongated member and having a ridge formed on its outer surface;
 a rigid housing member having means for surrounding the gripping member and for deforming the gripping member into a smaller size radially with respect to the elongated member thereby causing the gripping member to grip the flexible covering of the elongated member more securely; and
 a ridge on the housing member for cooperation with the ridge on the gripping member to fix the position of the gripping member within the housing member and to prevent withdrawal of the gripping member from the housing member.

2. The collet for elongated members according to claim 1 wherein the resilient gripping member is an open-ended, hollow plug of generally annular cross-section having a plurality of axial slots formed in it which permit deformation of the plug radially inwardly.

3. In a collet for engaging and securing electrical cables having a cable engaging resilient plug fitted with self-tapping threads adapted to be threadedly engaged with insulation of an electrical cable and with a circumferential ridge extending around its periphery, the combination with said plug of:
 means of smaller inside size than the outside size of the plug for surrounding the plug and for deforming the plug into a smaller size radially with respect to the electrical cable, and
 a surface on the deforming means for engaging the ridge on the plug and for thereby preventing axial movement of the plug with respect to the deforming means.

4. The combination according to claim 3 wherein the deforming means is a cup-shaped housing member having an inside diameter smaller than a corresponding outside diameter of the plug so that when the plug is placed in the housing the plug is deformed radially inwardly.

5. A collet for engaging and securing elongated members having flexible coverings including an internally threaded, resilient plug having a circumferential groove of a predetermined outside diameter extending around its outer periphery, the plug being fitted inside a rigid housing having an internal ridge of a predetermined inside diameter which is smaller than the outside diameter of the groove of the plug extending around its inner periphery with the groove of the plug in engagement with the ridge of the housing.

6. The collect according to claim 5 wherein the plug also has a plurality of slots extending axially along its length for increasing the resiliency of the plug.

References Cited by the Examiner

UNITED STATES PATENTS

| | | | |
|---|---|---|---|
| 1,835,155 | 12/1931 | Harbert | 248—56 |
| 2,538,043 | 1/1951 | Roy et al. | 24—114.5 |
| 2,717,792 | 9/1955 | Pelley | 288—2 |
| 2,856,451 | 10/1958 | Appleton | 174—77 |
| 3,076,668 | 2/1963 | Famely | 285—159 |
| 3,123,662 | 3/1964 | Fink | 174—65 |
| 3,156,491 | 11/1964 | Jackson et al. | 285—243 |
| 3,219,367 | 11/1965 | Franck | 285—238 |

CLAUDE A. LE ROY, *Primary Examiner.*

Disclaimer 3,300,163.—*John E. Randolph*, Palatine, Ill. COLLET FOR ELONGATED MEMBERS. Patent dated Jan. 24, 1967. Disclaimer filed Feb. 19, 1969, by the assignee, *Teletype Corporation*.

Hereby enters this disclaimer to all claims of said patent.

[*Official Gazette April 8, 1969.*]